United States Patent [19]
Lotspiech

[11] Patent Number: 5,786,907
[45] Date of Patent: Jul. 28, 1998

[54] HIGH SPEED COLOR COMPENSATION SYSTEM

[75] Inventor: Jeffrey Bruce Lotspiech, San Jose, Calif.

[73] Assignee: International Business Machines Corporation, Armonk, N.Y.

[21] Appl. No.: 361,781

[22] Filed: Dec. 20, 1994

[51] Int. Cl.$^6$ .................................. G03F 3/08
[52] U.S. Cl. ................. 358/518; 358/501; 382/162; 382/167; 395/109; 395/131
[58] Field of Search ................. 358/500, 501, 358/515, 518, 523, 525, 530; 382/162, 167; 395/109, 123, 131

[56] References Cited

U.S. PATENT DOCUMENTS

| | | | |
|---|---|---|---|
| 4,477,833 | 10/1984 | Clark et al. | 358/80 |
| 4,829,455 | 5/1989 | Long et al. | 364/521 |
| 4,874,986 | 10/1989 | Menn et al. | 313/505 |
| 4,897,736 | 1/1990 | Sugino | 358/457 |
| 4,941,039 | 7/1990 | D'Errico | 358/518 |
| 4,974,067 | 11/1990 | Suzuki | 358/75 |
| 4,975,769 | 12/1990 | Aizu et al. | 358/518 |
| 5,111,286 | 5/1992 | MacDonald et al. | 358/75 |
| 5,124,688 | 6/1992 | Rumball | 340/703 |
| 5,130,701 | 7/1992 | White et al. | 340/701 |
| 5,185,661 | 2/1993 | Ng | 358/75 |
| 5,233,412 | 8/1993 | Nishihara | 358/75 |
| 5,307,182 | 4/1994 | Maltz | 358/518 |
| 5,331,439 | 7/1994 | Bachar | 358/500 |
| 5,390,035 | 2/1995 | Kasson et al. | 358/518 |
| 5,432,892 | 7/1995 | Hafner et al. | 395/131 |

FOREIGN PATENT DOCUMENTS

| | | | |
|---|---|---|---|
| 3131920 | 6/1991 | Japan | G06F 3/12 |
| 3229573 | 10/1991 | Japan | H04N 1/46 |

*Primary Examiner*—Thomas D. Lee
*Attorney, Agent, or Firm*—Baker, Maxham, Jester & Meador

[57] ABSTRACT

A color compensation system maps and translates between colors and colorants with improved speed and accuracy. The invention also contemplates colorant-to-color and colorant-to-colorant translations. In one embodiment, an improved color-to-colorant map is first created by creating a multi-dimensional lattice, then dividing this lattice into sub-lattices of selected sizes. A "nominal" sub-lattice is then constructed for a given colorant. Next, that colorant is expressed as a function of color-dependent component parts, and this relationship is used to construct initial lookup tables to convert the input colors to average colorants. Then, final lookup tables are generated, one for each sub-lattice, to convert average colorants to actual colorants. The above steps are repeated for each colorant. This process effectively creates a high-speed color-to-colorant map. After the improved map is created, it is implemented in a processor, which uses the map during translation. When the processor is conducting a translation, the processor first determines the average value of a selected one of the colorants by processing its input colors with an initial lookup table. Next, the processor identifies the applicable sub-lattice for one of the colorants, and applies the lookup table of the identified sub-lattice to receive the actual colorant. After the processor repeats these steps for the remaining colorants to complete the translation, the resultant colorants may be displayed with an output device.

16 Claims, 12 Drawing Sheets

| (R,G,B) | ACTUAL CYAN OUTPUT COLORANT | ACTUAL MAGENTA OUTPUT COLORANT | ACTUAL YELLOW OUTPUT COLORANT |
|---|---|---|---|
| (1,0,0) | 12 | 6 | 242 |
| (2,0,0) | 242 | 30 | 190 |
| (3,0,0) | 56 | 39 | 89 |
| ⋮ (255,255,255) | 99 | 17 | 130 |

HIGH SPEED COLOR COMPENSATION SYSTEM

BACKGROUND OF THE INVENTION

1. Field of the Invention

The present invention generally relates to the representation of color by computer-driven machines such as video monitors and printers. More specifically, the invention concerns a system for mapping and translating between input device-dependent colors and output colorants with improved efficiency.

2. Description of the Related Art

With computers, there are many occasions where image colors represented in a color system of one device must be converted or "mapped" for use by a device employing a different color system. At some point, colors detected by the optical components of a scanner or digitizer, for instance, must be represented in the scanner's electronic memory. A similar but opposite problem arises when colors represented in computer memory are physically printed onto paper or film. This issue also arises when a user, viewing a color image on a computer monitor, wishes to print these colors, identically as displayed, using a computer printer.

Usually, a computer-compatible color image is represented by a two-dimensional array of individual, visual picture elements called "pixels", each of which is stored in computer memory. Each pixel includes a value representing color in the image according to an encoding scheme. Under the popular "RGB" scheme, all colors can be described mathematically with reference to the amount of each primary color (i.e. red, green, blue) present therein. The value of each primary color may be given in integers within a certain range, such as 0 to 255. Thus, the color shown by a pixel can be represented by a pixel value comprised of three integers in the range 0–255, where each integer represents a respective primary color.

In addition to computer memories, the RGB scheme of representation is used in "real devices", i.e. devices that interface with a tangible medium such as paper or film. Real devices represent color with "colorants". In this regard, a "colorant" is a physical material with a primary color attribute. Colorants are, therefore, renditions of primary colors. Since a color printer starts with paper that is white (thus containing all colors), the printer must put down colored ink that subtracts the primary colors from white. Hence, a printer's colorants include a cyan ink (cyan is the absence of red), a magenta ink (magenta is the absence of green), and a yellow ink (yellow is the absence of blue). Color printers frequently add a fourth ink (black) to use in cases where it would otherwise have to put down cyan, magenta, and yellow inks together. This is done to increase the color accuracy of the printout, and to save money, since black ink is typically less expensive than colored ink.

Another example of a real device is a video monitor. Unlike printers, however, a monitor produces colors by illuminating red, green, and blue phosphors. Whether the real device is an optical scanner, printer, video monitor, or another device, accurately "mapping" between input colors and output colorants is a complicated function. Mapping is often complicated by the ways in which colorants interact with each other, as well as any non-linearities that each colorant might have.

Additionally, particularities of the real device itself can vex the mapping process. Optical scanners, for example, often experience color interpretation errors due to the use of an imperfect color filter set. This results in significant errors between the actual input colors and the colors as perceived by a human being. As a result, it is often necessary to correct the signals generated by scanners to account for color interpretation errors produced by the color filter set.

In converting between colors and colorants (or vice versa), there are basically two steps: mapping and translation. For ease of explanation, the example of color-to-colorant conversion will be considered. First, the mapping process involves considering each possible color and determining the appropriate mix of colorants to duplicate that color. If, for example, the input color is represented by an RGB value of (100, 100, 100), a mixture of cyan, magenta, and yellow colorants can be experimented with until the resultant colorant visually matches the input color.

For a given input and output device, the mapping process is only performed once; this establishes the relationship between all possible input colors and the available output colorants of the output device. Once these relationships have been established, the next task is to develop a vehicle for rapidly applying these relationships ("translating") during the ongoing operation of the devices. Specifically, during the operation of a computer, it is often necessary to quickly translate between input colors produced by an input device and output colorants. It is desirable to translate as speedily as possible to minimize any delay experienced, for example, in waiting for a computer to print a document.

Some known translation methods have used lookup tables, which typically contain a corrected colorant for each possible input combination of input colors. A lookup table is used simply by referencing a specific input color (or colorant) in the table, and reading the resultant output colorant (or color) indexed for that input color (or colorant).

As shown in FIG. 1, a lookup table can be thought of as a three-dimensional array of values, evenly-spaced in the array. This volume of evenly spaced points, called a "lattice", may be in the form of a cube 100, for example. Each three-dimensional location contains a numerical colorant value (a combination of cyan, magenta, and yellow) whose corresponding colors (red, blue, green) are indicated by its three-dimensional coordinates indicated by the red 102, blue 104, and green 106 axes. In the example of FIG. 1, the point 108 would represent a combination of three colorants corresponding to an RGB value of (50, 50, 50).

Although the use of lookup tables has an attractive simplicity for translating between colors and colorants, storage of lookup tables is disadvantageous in many cases. Specifically, storing representations of such an immense number of possible color variations would likely require a memory that is prohibitively expensive for most applications. With a range of 256 shades of each primary color, for example, there would be 16 million entries.

Numerous attempts have been made to reduce the size of lookup tables. For instance, some approaches have used lookup tables that do not contain corrected colorants for all possible input colors. Instead, the table only contains colorants for certain input colors, possibly occurring at some regular interval.

Corrected colorants may be derived for each input color not listed in the lookup tables by interpolating from nearby data in the lookup table. Such an abbreviated lattice is called an "interpolation lattice." Interpolation lattices are used in several known real devices such as the Hewlett Packard 1200C printer and the Tektronix 4693 (model 2) printer.

Some exemplary approaches to the use of interpolation in lookup tables are found in the following U.S. patent applications, all commonly assigned with this application and incorporated herein by reference:

1. Ser. No. 07/968,643, "Method and Means for Evaluating a Tetrahedral Linear Interpolation Function," filed on Oct. 29, 1992;
2. Ser. No. 07/981,961, "Volumetric Linear Interpolation," filed Nov. 25, 1992;
3. Ser. No. 07/996,805, "Method and Means for Tetrahedron/Octahedron Packing and Tetrahedron Extraction for Function Approximation," filed Dec. 23, 1992; and
4. Ser. No. 07/996,306, "Function Approximation Using a Centered Cubic Packing with Tetragonal Disphenoid Extraction," filed Dec. 23, 1992.

Although interpolation lattices are adequate for many applications, they do not operate with the level of accuracy that many applications might require. Many interpolation lattices are linearly designed, such that each colorant calculated by the table is evenly spaced between adjacent values of the table. While such lattices may be sufficient for colorants that are linearly related, the results in non-linear situations may not be completely satisfactory for some applications.

One alternative to interpolation is the "summation lookup table." A summation lookup table divides a linear output function into component parts, with each component being represented as a function of an input value. Equation 1 (below) shows an example of a linear output function, which expresses cyan in terms of red, green, and blue components.

$$\text{cyan} = R \times \text{red} + G \times \text{green} + B \times \text{blue} \quad [1]$$

In Equation 1, R, G, and B are constants, which can be found from color measurements taken by any number of well known techniques. Using a traditional approach, the formula of Equation 1 is implemented by performing the calculation directly: the value of the cyan colorant is found by multiplications and additions of the red, green, and blue colors. Using summation lookup tables, however, Equation 1 is implemented with three tables: one that returns R×red (as a function of red), one that returns G×green (as a function of green), and one that gives B×blue (as a function of blue). It is well understood in the art that, when using the summation lookup tables, the multiplication functions of Equation [1] can be replaced by arbitrary functions, which may be represented as $f_R$, $f_G$, and $f_B$. The functions $f_R$, $f_G$, and $f_B$ may be determined, for example, by applying certain "functional approximation" methods to the relationship between the input colors and output colorants, i.e. by applying functional approximation to the traditional lookup table. The value of an output colorant, then, is found by referencing each summation lookup table and summing the results, as shown in Equation 2 (below).

$$\text{cyan} = f_R(\text{red}) + f_G(\text{green}) + f_B(\text{blue}) \quad [2]$$

In some applications, summation lookup tables can be used to help implement a translation with reduced memory, when compared to a traditional lookup table or an interpolation lookup table. Likewise, summation lookup tables are often faster when compared to the traditional direct calculation method. However, for many applications, summation lookup tables are still not completely adequate, because relationships such as Equation [2] do not sufficiently approximate the actual translation function. Many users still desire more accurate translation than summation lookup tables can provide without the poor performance of interpolation tables.

With larger graphics displays, the need for faster, more accurate translation is becoming increasingly important. Speed is crucial, because the translation function must be applied to each pixel of a color image, and there may be millions of picture elements in a digital image. Due to the limitations of known approaches to mapping and translation, however, there is a need for an improved system for mapping and translation.

SUMMARY OF THE INVENTION

The present invention concerns a system for mapping and translating input colors to output colorants with improved speed and accuracy. In an illustrative embodiment, the following two-step approach is used. First, a detailed map between input colors and their corresponding colorants is systematically analyzed to create an improved color-to-colorant map. Then, the improved map is implemented in a computer or a computer peripheral, to perform high-speed color-to-colorant translations. The invention also contemplates other maps and translations, such as colorant-to-color, for example.

The color-to-colorant map of the invention is created by performing a number of steps. First, the detailed map is considered in the form of a three-dimensional lattice, which is divided into sub-lattices of selected sizes.

Then, a "nominal" sub-lattice is constructed for a given colorant. Next, the colorant of the nominal sub-lattice is expressed as a function of color-dependent component parts. This information is implemented in the form of a summation lookup table. Then, various lookup tables are constructed to convert average colorants to actual colorants for each sub-lattice. These steps are repeated for each colorant. This process effectively creates an improved map of colors to colorants.

After the map is created, it is implemented in a processor, which uses the map during translation operations. When the processor is conducting a translation, it performs certain steps. First, the processor identifies the applicable sub-lattice for one of the current colors. Then, the processor calculates the average value of that colorant. Next, the processor applies the lookup table of that sub-lattice to receive the actual colorants. After these steps are repeated for each color, the processor is equipped with a translation of each specific input color to a specific set of output colorants.

The processor finally completes its operations by applying the translation. In a printing environment, for example, the final step would be for the processor to use the color-to-colorant translation in printing the desired colorants. With an optical scanner, the final step would involve providing a CPU with color coordinates for input colorants observed during scanning.

The invention affords its users with a number of distinct advantages, primarily by providing a color-colorant translation scheme of significantly improved speed. This increase in translation speed is still realized in situations that were previously problematic, such as large data sets, nonlinear color-to-color relationships, and complex translation functions. The invention is also beneficial because it introduces very little error, if any, and such error is usually imperceptible to the human eye. Another advantage of the invention is that it can be implemented with a minimum of memory.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

GENERAL OPERATION

In a general sense, the present invention provides an improved system for mapping, and then translating between colors and colorants, or vice versa. In this description, a number of references are made to mapping and/or translating specifically from colors to colorants. It is understood that such examples are provided chiefly for ease of understanding, and the invention is equally applicable to mapping and translating from colorants to colors.

The invention involves a two-step process: first an improved color-colorant map is constructed, then the map is implemented each time a color-colorant conversion is performed. Implementation of the map is called "translation." After the mapping relationship between a set of colors and a set of colorants has been painstakingly established, the invention is used to provide a more efficient map as well as a system for quickly using the map to translate input colors to output colorants.

Figure 1:
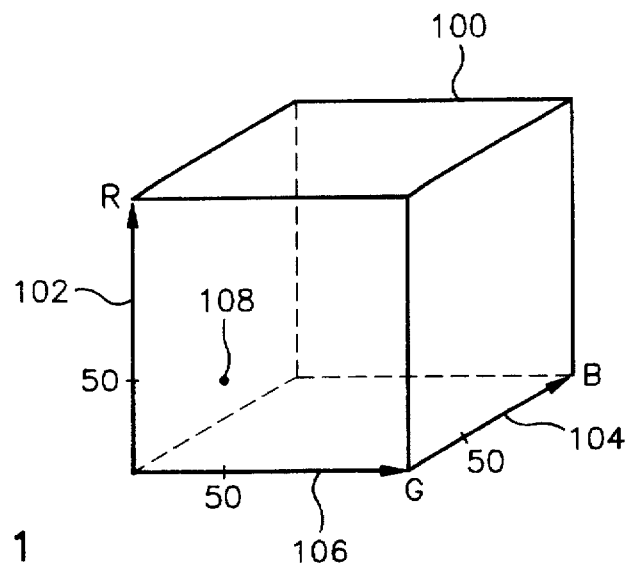
FIG. 1 is an isometric drawing of a lattice used in translating between input colors and output colorants.
Figure 2:
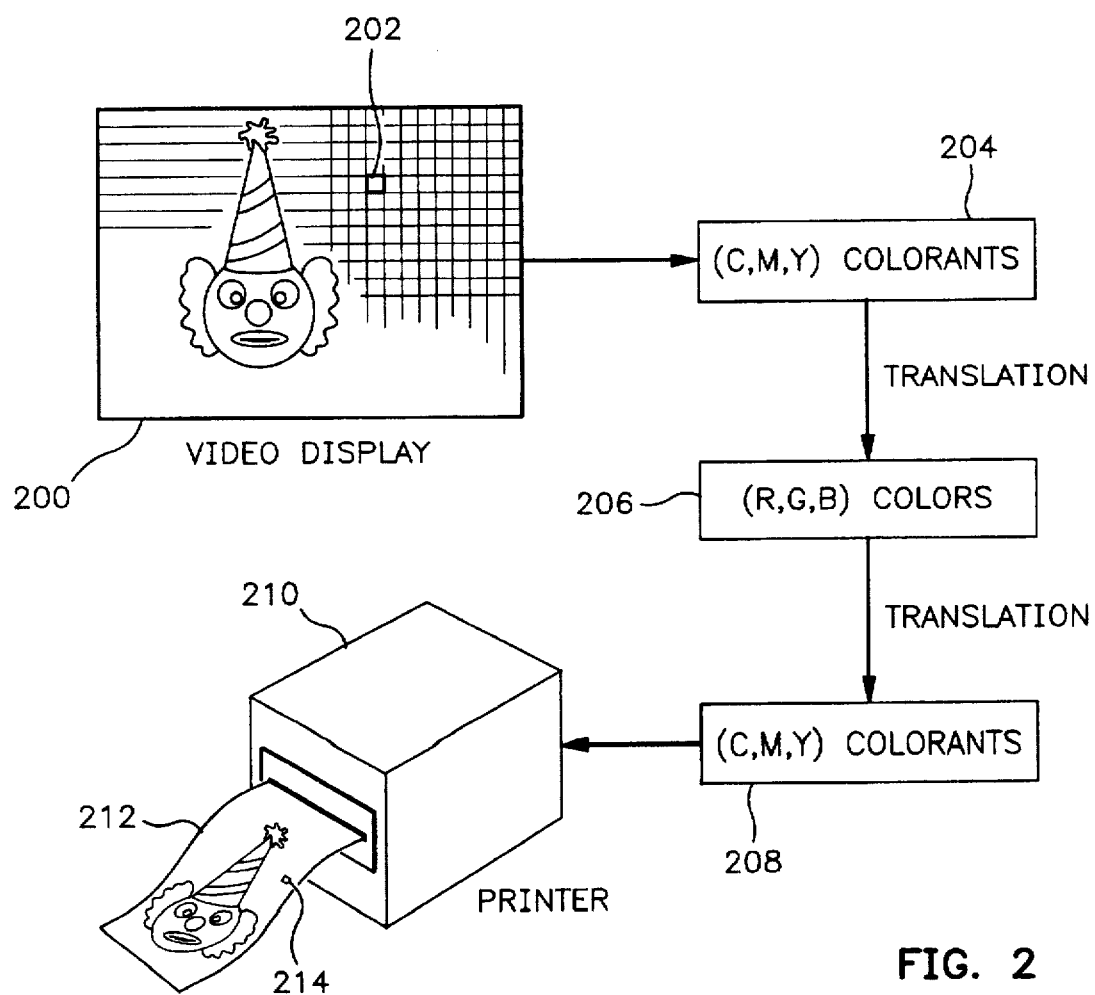
FIG. 2 is a diagram illustrating a series of translations from video display colorants to computer printer colorants, in accordance with the invention.

In a broad sense, the invention can be used to enable one computer device to output a colorant that matches a colorant from a different device. FIG. 2 depicts an example of this, applied to the task of using a printer 210 to make an identical copy of an image originally displayed on a video display 200. The display 200 includes a multiplicity of pixels, where each pixel is represented by a data object including a set of three colorants. The pixel 202, for example, is represented at an addressable location in memory by the colorants 204. First, the colorants 204 are translated to provide a set of colors 206. The colors 206 may comprise RGB values, for example. Then, based on the colors 206, techniques of the invention are applied to generate colorants 208 corresponding to the printer 210. The printer then uses these colorants 208 to print an image 212. The image 212 includes a pixel 214 whose colorants are produced by processing of the colors of the pixel 202 at 204, 206 and 208.

HARDWARE COMPONENTS AND INTERCONNECTION

Figure 3:
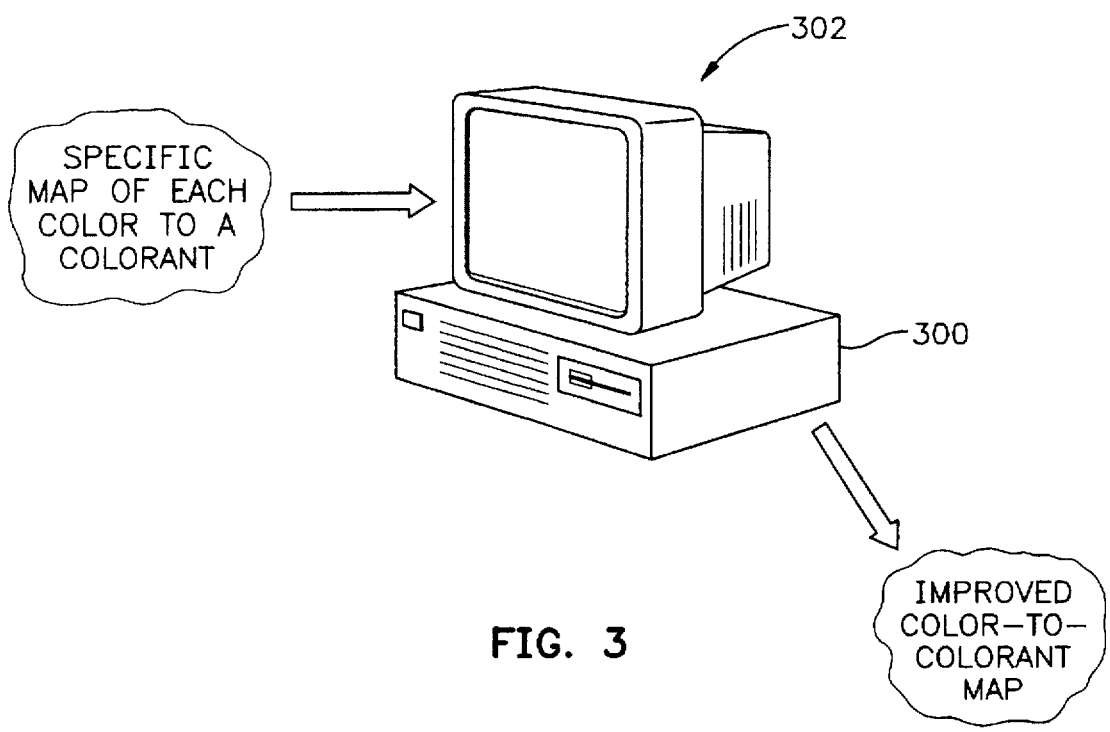
FIG. 3 is a diagram of a computer 302 used to implement an improved mapping function in accordance with the invention.

The invention may be implemented using a number of different hardware configurations. For instance, as shown in FIG. 3, the mapping function of the invention may be implemented by a central processing unit ("CPU") 300 of a computer 302, which may comprise a personal, mini, super-mini, mainframe, or other computer with sufficient processing capability.

With this arrangement, the CPU 300 receives a detailed map indicating the relationship between each possible input color and a corresponding output colorant. The detailed map, which may be created in accordance with various techniques that are already well known in the art, is specific to the particular translation that will eventually be performed. For example, the map may show the relationship between input colorants detected by an optical scanner and RGB output colors. Upon receiving the detailed map, the CPU 300 creates a more efficient map, capable of being referenced much more quickly than the detailed map. This process is illustrated in greater detail below.

Figure 3A:
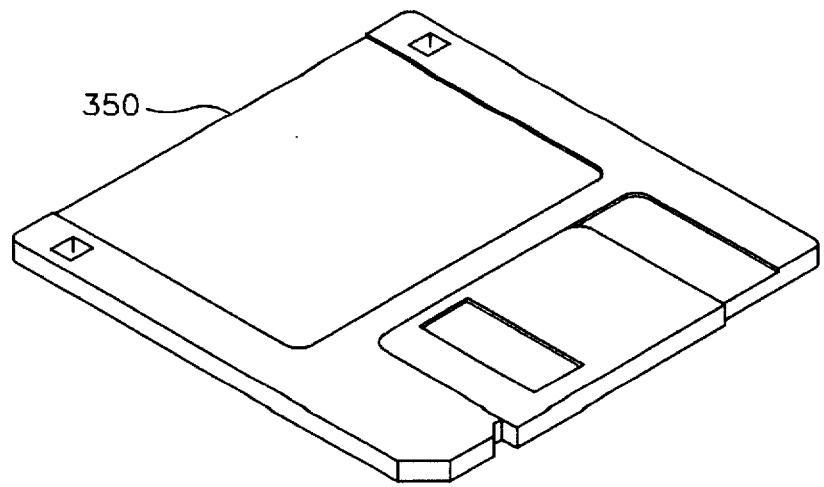
FIG. 3A is a diagram of a computer-readable diskette 350 for use in accordance with the present invention.

In one embodiment, the CPU 300 may perform the mapping process by executing a series of computer-readable instructions contained on a data storage medium, such as a computer diskette 350 (FIG. 3A). However, the instructions may also be contained on a DASD array, magnetic tape, conventional "hard disk drive", electronic read-only memory, optical storage device, set of paper "punch" cards, or another data storage device.

Figure 4:
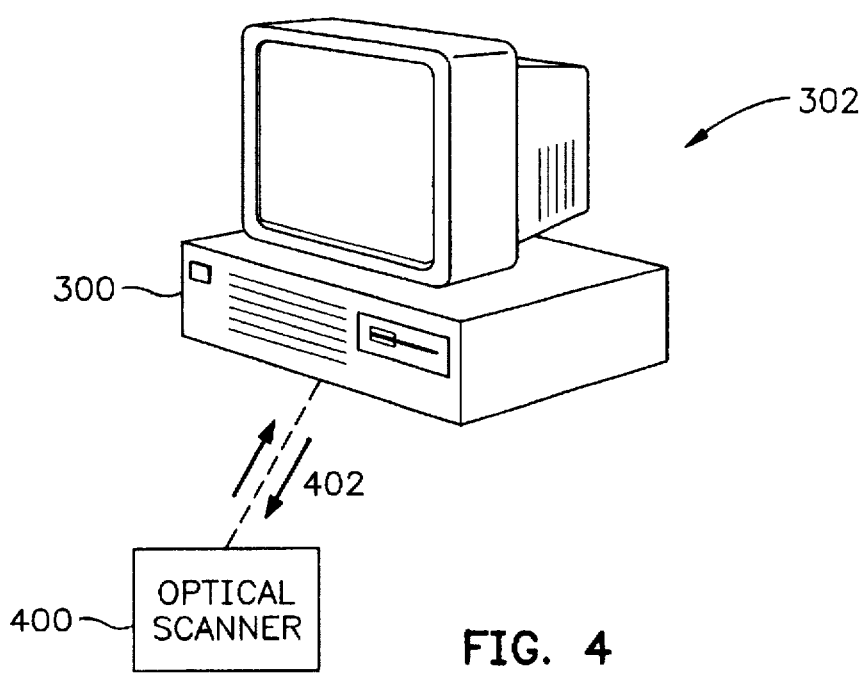
FIG. 4 is a diagram showing a computer 302 performing supervised mapping for a peripheral 400, in accordance with the invention.

After the CPU 300 creates the improved map, the map must be installed for use in subsequent translations. An illustrative embodiment is shown in FIG. 4, where the computer 302 is using an optical scanner 400 as a peripheral. In this embodiment, the translation function of the invention is implemented centrally by the CPU 300 itself, in assistance to the scanner 400. This relationship may be called "supervised" translation. When the scanner 400 needs to translate an input colorant to an output color, for example, the CPU 300 performs the translation, based on the improved map created previously, and returns the results to the scanner 400. Accordingly, two-way communications 402 are indicated between the CPU 300 and the scanner 400.

The CPU 300 may conduct translation by executing a series of computer-readable instructions contained on a data storage medium, such as a computer diskette 350 (FIG. 3A), DASD array, magnetic tape, a conventional "hard drive", electronic read-only memory, optical storage device, or set of paper "punch" cards.

Figure 5:
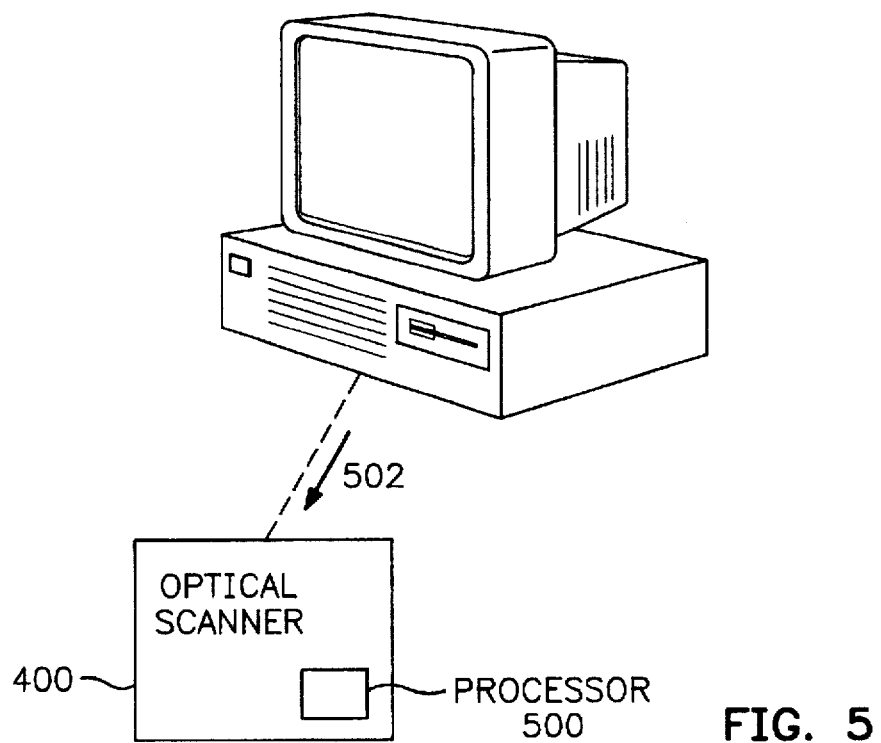
FIG. 5 is a diagram showing the computer 302 and the peripheral device 400, where a processor 500 of the peripheral 400 is performing local mapping, in accordance with the invention.

An alternative embodiment is shown in FIG. 5, where the optical scanner 400 includes its own processor 500. Here, the CPU 300 downloads the improved map to the scanner's processor 500, which uses the improved map to perform local translation operations as needed. This relationship may be called "local" translation. Here, only one-way communications 502 are indicated between the CPU 300 and the scanner 400. Local translation may be performed, for example, by using the processor 500 to execute a series of computer-readable instructions contained on a data storage medium such as the computer diskette 350 (FIG. 3A). Alternatively, other data storage media are contemplated by the invention, such as a DASD array, magnetic tape, conventional "hard drive", electronic read-only memory, optical storage device, or set of paper "punch" cards.

SPECIFIC OPERATION

Figure 6:
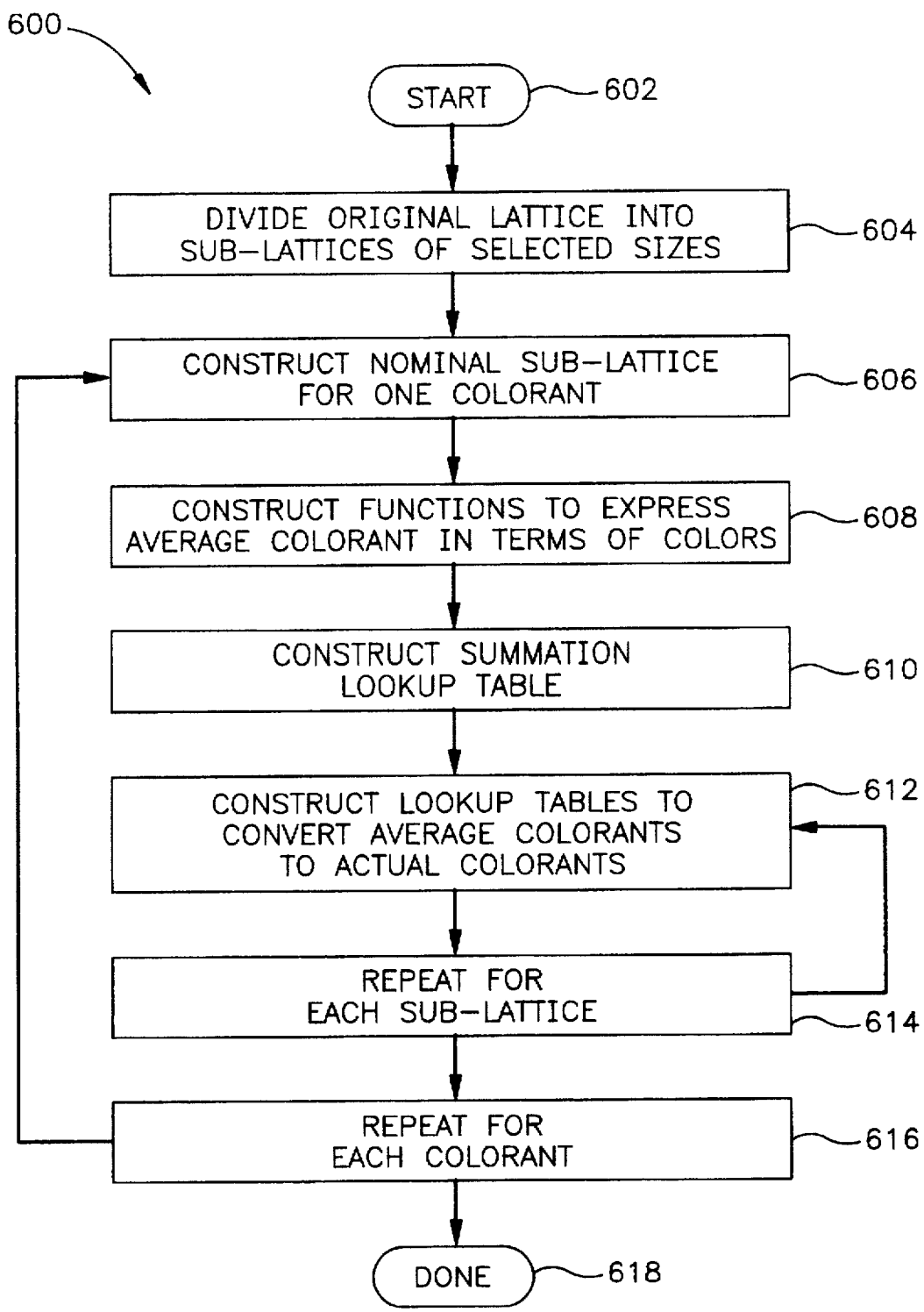
FIG. 6 is a flowchart illustrating a sequence of illustrative steps used to perform the mapping function of the invention.

The method of the invention may be carried out by performing a number of tasks with one or more digital computing systems. FIG. 6 sets forth a preferred embodiment of tasks 600 to create an improved color-to-colorant map. The tasks 600 are preferably performed by a CPU 300 (FIG. 3), which may be carried out, for example, with any one of a variety of commercially available microprocessors, such as the Motorola 68000, Motorola 68020, AMP 29000, Intel 960, Intel 286, Intel 386, Intel 486, or another suitable microprocessor. The tasks 600 may be embodied in a sequence of computer-readable instructions, such as lines of "C" language code (not shown).

For ease of understanding, FIG. 6 will describe a color-to-colorant mapping. However, it is understood that the scope of the invention is not so limited, and may apply to colorant-to-color mapping, or mapping between colorants of different peripheral devices, for example. When the tasks 600 are initiated in task 602, it is assumed that a detailed map is already available, containing the relationship between all possible input colorants and their corresponding output colorants. Assuming a three-colorant system is used, this map is divided into three original lattices—one for each colorant. This step may be performed using known techniques.

Task 604 begins by dividing a selected one of these original lattices into "sub-lattices" of selected sizes. For ease of understanding, the processing of one lattice will be described completely. It does not matter which lattice is first processed, since the other lattices will be processed similarly.

Figure 6A:
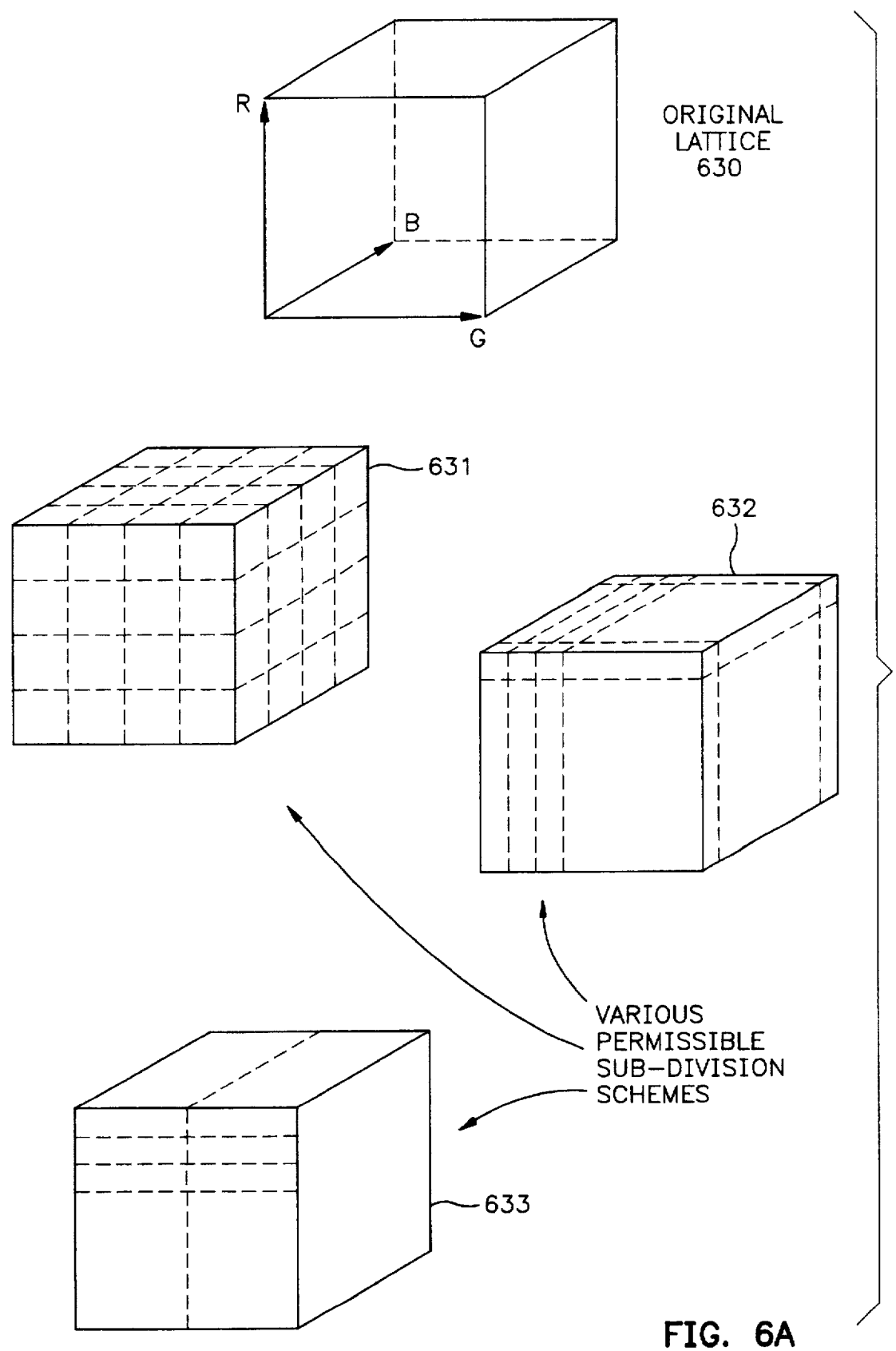
FIG. 6A is a diagram showing an original lattice 630, and several permissible sub-division schemes 631-633, in accordance with the invention.

Although it is not necessary to the invention, the sub-lattices are preferably selected to overlap insofar as they share the points where they touch. This improves the accuracy of certain operations, which are discussed below (i.e. tasks 612 and 614). The sub-lattices need not have identical sizes, as long as they are formed by repeatedly slicing the original lattice completely through with planes that are parallel to any two axes of the original lattice. FIG. 6A shows an illustration of an exemplary original lattice 630, and several permissible sub-division schemes 631–633.

Selecting smaller sub-lattices has the advantage of providing more accurate mapping, but the disadvantage of requiring more memory, since there are more sub-lattices to be stored. In accordance with the invention, the lattice 630 may be strategically sub-divided to minimize any irregularity, non-linearity, or other unusual behavior that may be difficult to model. Specifically, undesirable behavior can be minimized by creating smaller sub-lattices in the problematic region, thereby modeling that region in more detail. With this approach, the unusual behavior is minimized by selecting small enough sub-lattices that, over the limited range of each sub-lattice, the behavior is not so unusual. This approach is especially useful for use in lattice regions that have larger "gradients", i.e. differences in values between one lattice plane and the next.

Next, task 606 constructs a "nominal" sub-lattice, which is an average of all sub-lattices. Specifically, task 606 is performed by averaging the values of all the corresponding points in all sub-lattices of the original lattice. If cyan is the colorant being processed, for example, each point in the nominal sub-lattice is filled with the average value of cyan found in corresponding points of all sub-lattices.

If all sub-lattices are sized the same, constructing the nominal sub-lattice is a straightforward process. However, if the sub-lattices are sized differently, the following technique is used. In this case, the nominal sub-lattice is as large as the largest sub-lattice. The sub-lattices are averaged together by assigning registration points in each sub-lattice, and averaging values of each sub-lattice that have similar positions with respect to their registration points. For those points in the minimal sub-lattice that have no corresponding points in certain smaller sub-lattices, there are simply less values that contribute to the average of those points. The registration points may be selected by any suitable criteria, such as by selecting a corner with the lowest red, green, and blue input.

In a preferred embodiment, after creating the nominal sub-lattice, its values are scaled so that the minimum is 0 and the maximum is N, where N is some number less than 256. Larger values of N will increase the accuracy of the mapping process, but will require storage of larger tables in memory.

Figure 6B:
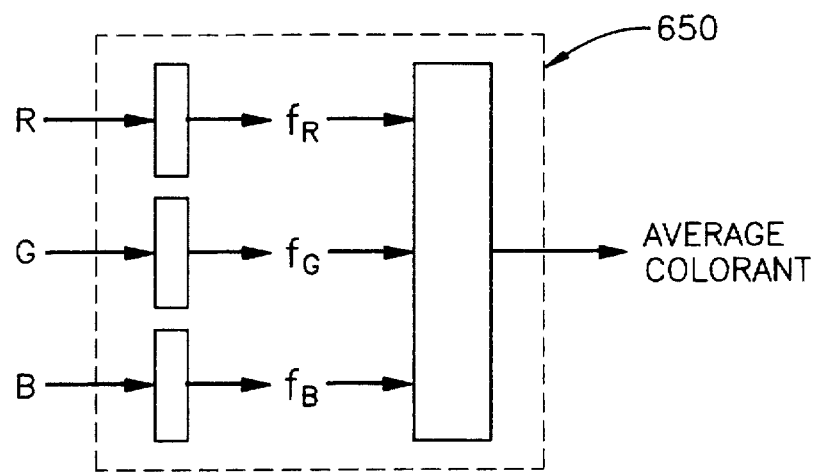
FIGS. 6B-6C are diagrams showing lookup tables constructed in accordance with the invention.

Then, task 608 constructs a function to express each value of the nominal sub-lattice in terms of its three-dimensional coordinates (i.e. red, blue, and green axis locations). This task is preferably performed using techniques for "functional approximation", the details of which are described below. After task 608, task 610 constructs a summation lookup table for the function of task 608. This lookup table, called an "initial" lookup table 650, is illustrated in FIG. 6B.

Next, tasks 612 and 614 map the values of the initial lookup table to resultant colorants; this process is repeated for each sub-lattice. In other words, separate mappings are performed to find the "best fit" from the values of the initial lookup table to specific values of actual colorants for each sub-lattice. This may be done using any of a number of known methods, such as the "least squares" method of linear approximation.

Figure 6C:
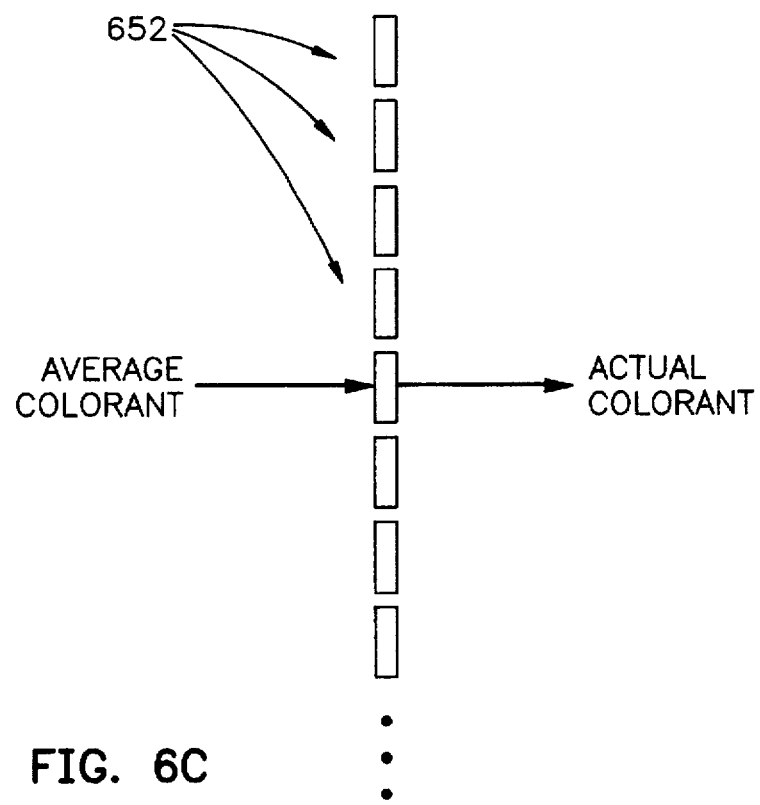

After this relationship is established, "final" lookup tables 652 are constructed to implement this best fit, with each final lookup table corresponding exclusively to a specific sub-lattice. Using cyan as an exemplary colorant, a final lookup table would be used to find an actual cyan value based upon the average cyan value received from the initial lookup table (task 610). FIG. 6C depicts a set of exemplary final lookup tables 652. After task 614, task 616 causes tasks 606, 608, 610, 612, and 614 to repeat for the remaining colorants, e.g. magenta and yellow in the present example. After these tasks are repeated for all colorants, the routine ends in task 618.

In addition to the steps 600 of FIG. 6, the invention may also be illustrated by a sequence of pseudo code, as shown below in Table 1. The illustrated sequence of pseudo code is performed once for each output colorant.

FUNCTIONAL APPROXIMATION

Figure 7:
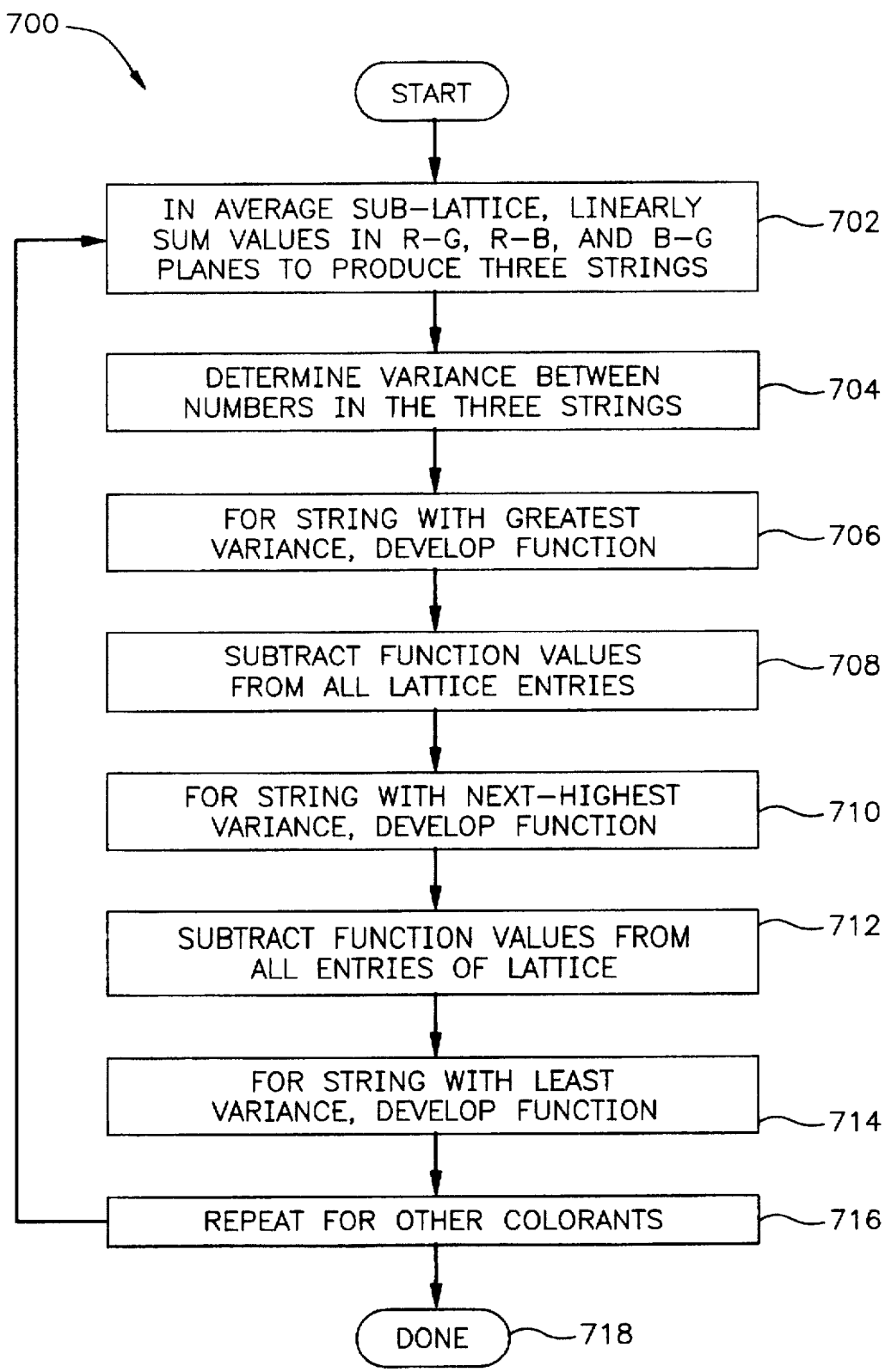
FIG. 7 is a flowchart illustrating a sequence of illustrative steps used to perform functional approximation in accordance with the invention.
Figure 7A:
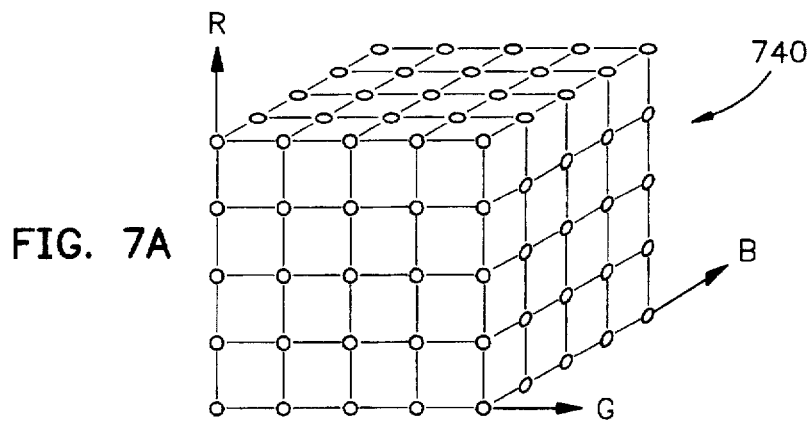
FIGS. 7A-7D are diagrams showing operations used to conduct functional approximation of colors in accordance with the invention.

In a preferred embodiment, the functional approximation of task 608 is carried out by performing the tasks 700 shown in FIG. 7. The routine 700 begins by examining one of the nominal sub-lattices previously constructed in task 606. It does not matter which colorant's sub-lattice is examined first, since these steps will be repeated for the other colorants' sub-lattices. Basically, task 702 linearly sums the values of the red-green, red-blue, and blue-green planes to produce three "strings." This is illustrated in greater detail in FIGS. 7A–7C. FIG. 7A displays a nominal sub-lattice 740 for cyan, as an example. Each miniature circle represents a specific value of cyan, corresponding to the circle's three-dimensional coordinates (i.e. R,G,B).

Figure 7B:
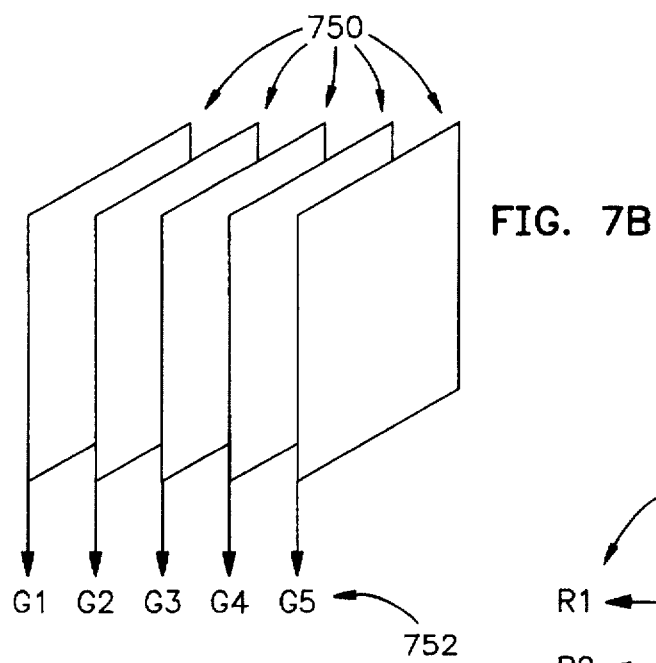
Figure 7C:
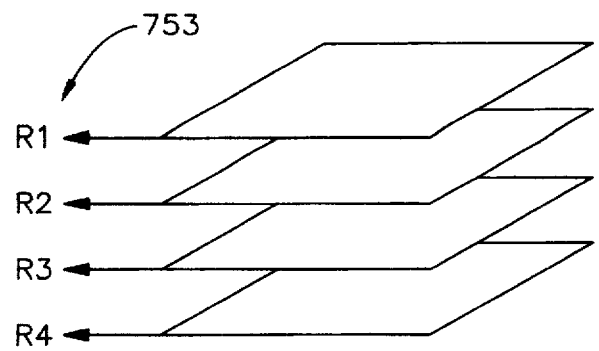
Figure 7D:
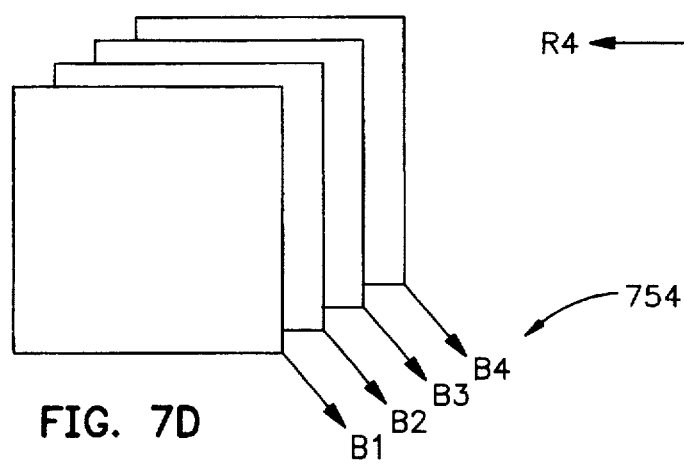

The "linear summing" of task 702, then, involves summing the values of all colorants in a plane defined by two colors, and attributing the sum to a point on the axis of the third color. This process is repeated for all planes defined by those same two colors. In the present example, the nominal sub-lattice 740 contains five planes that intersect the G (green) axis. As shown in FIG. 7B, the colorants of each plane 750 are separately added to provide a string 752 of five sums (G1–G5), each associated with a different point on the G axis. As shown in FIGS. 7C–7D, task 702 also repeats this process for the other planes of the sub-lattice 740, yielding strings 753–754 distributed along the R and B axes.

After task 702, task 704 computes the variance between the sums in a given string, and repeats this process for the other two strings. For the string with the greatest computed variance, task 706 then determines the relationship between the values of that string and the axis along which it is distributed. Using the string 752 as an example, the summed colorants G1–G5 would be expressed as a function of their position along the G axis to generate an expression, as shown in Equation 3 (below).

$$\text{summed colorant} = f(G) \quad [3]$$

After task 706, task 708 subtracts the values of the string 752 from all entries of the nominal sub-lattice 740. Then, task 710 takes the string with the second-greatest variance, and determines the relationship between the values of that string and the axis along which it is distributed. If, for example, the next-highest variance was found in the string 753, task 710 would express that string as a function of red, as shown in Equation 4 (below).

$$\text{summed colorant} = f(R) \quad [4]$$

Then, task 712 subtracts the values of the string 753 from all entries of the sub-lattice 740. In task 714, the string 754 is expressed as a function of blue. Then, task 716 repeats the above-mentioned steps for the sub-lattices corresponding to the remaining colorants, e.g. magenta and yellow. When all colorants have been processed, the routine ends in task 718. The tasks 700 may also be illustrated using pseudo code, as shown below in Table 2.

Although the routine 700 is preferably used to carry out the functional approximation of task 608, a number of other methods may be used. Various widely available sources, such as statistics textbooks, describe other known techniques for "functional approximation," which may be used in carrying out the invention.

TRANSLATION

As mentioned above, the mapping process is only performed once for a given input and output device. Once these relationships have been established, a translation scheme is developed to rapidly apply the relationships established by mapping. Then, during the ongoing operation of a device, the translation scheme is applied as needed to translate input colors (or colorants) to output colorants (or colors).

Figure 8:
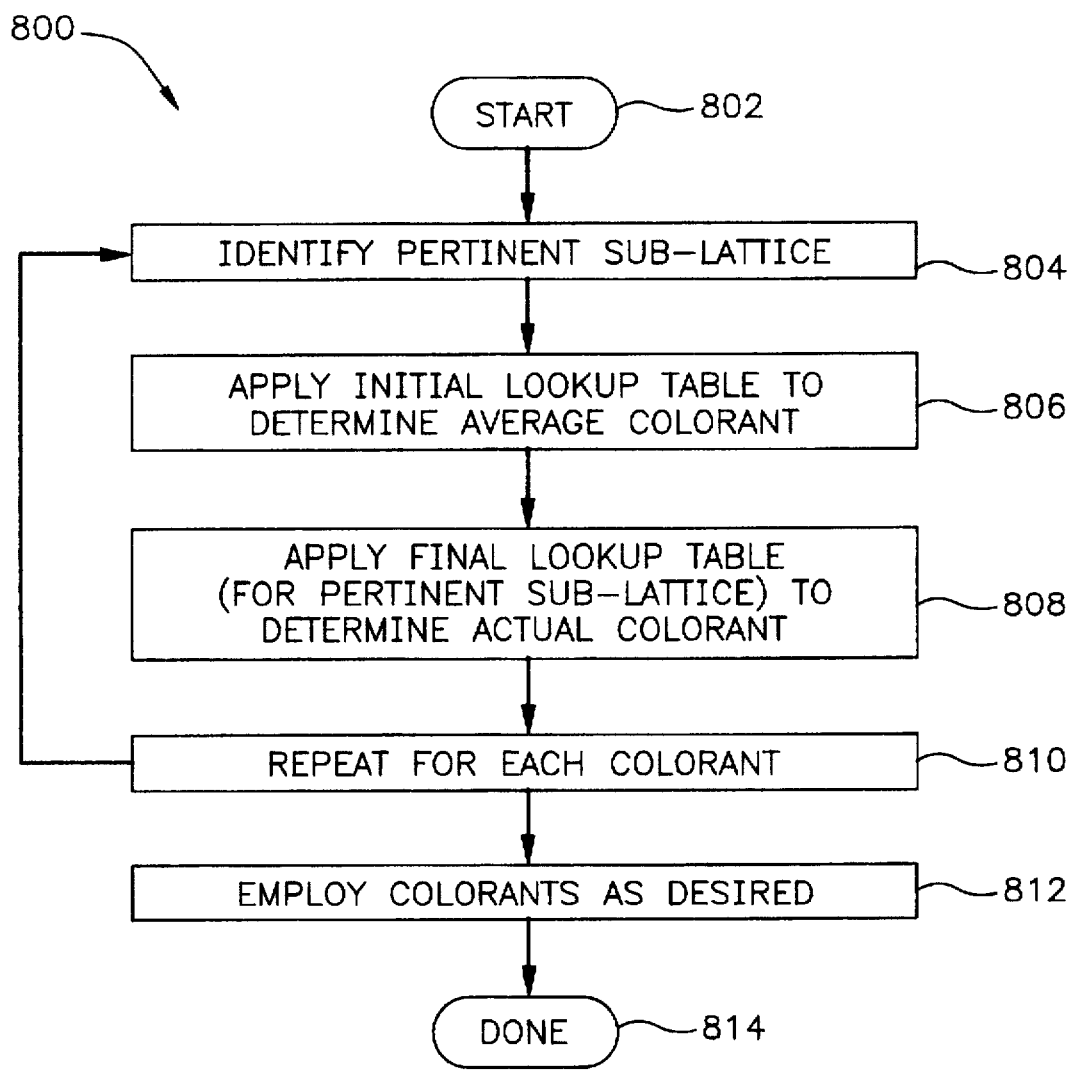
FIG. 8 is a flowchart illustrating a sequence of illustrative steps used to perform the translation function of the invention.

Whether translation is to be performed locally or under supervision, it may be carried out using a set of tasks 800, as shown in FIG. 8. The translational function of the invention may be carried out with any one of a variety of commercially available microprocessors, such as those described above. The tasks 800 may be embodied in a sequence of computer-readable instructions, such as lines of "C" language code (not shown).

In the present example, it is assumed that a set of input colors are provided, and translation is to be performed to convert these colors to output colorants. For this translation, an exemplary output device might be a computer printer.

After the routine is initiated in task 802, task 804 determines which sub-lattice of the original lattice 630 contains the three-dimensional coordinates corresponding to the input colors. If the sub-lattices were originally selected to overlap in task 604, and the input colors coincide with an overlapping region, any of the overlapping sub-lattices may be selected. However, a common scheme for arbitrating between overlapping sub-lattices is preferably applied with consistency.

Figure 8A:
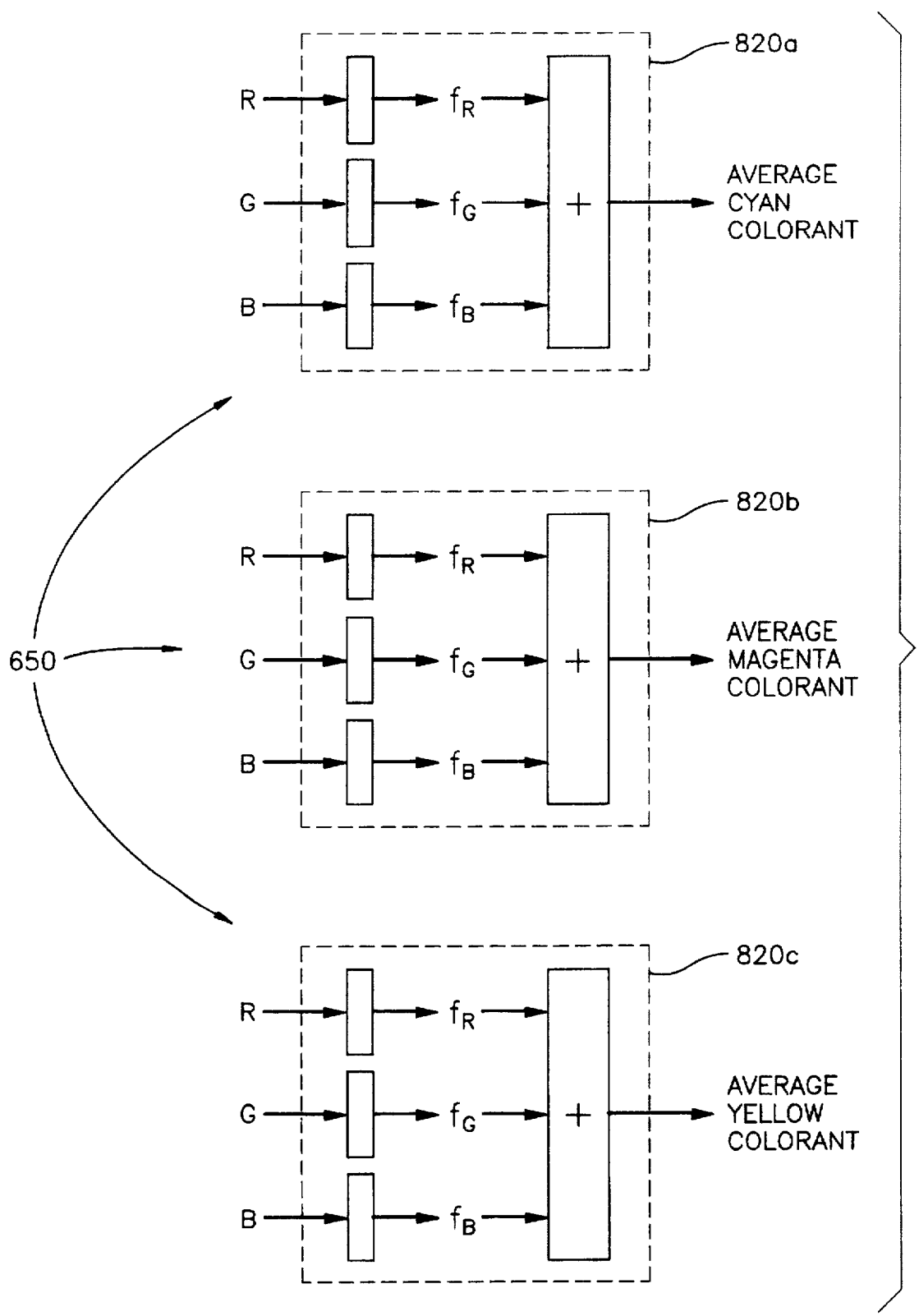
FIGS. 8A-8B are diagrams illustrating the use of initial 820 and final 822 lookup tables in the translation process, in accordance with the invention.

After task 804, task 806 applies the appropriate one of the initial lookup tables 650 to determine the average colorant, as shown in FIG. 8A. If, for example, translation is being performed for cyan, the initial lookup table 820a will be used.

Figures 8B, 10:
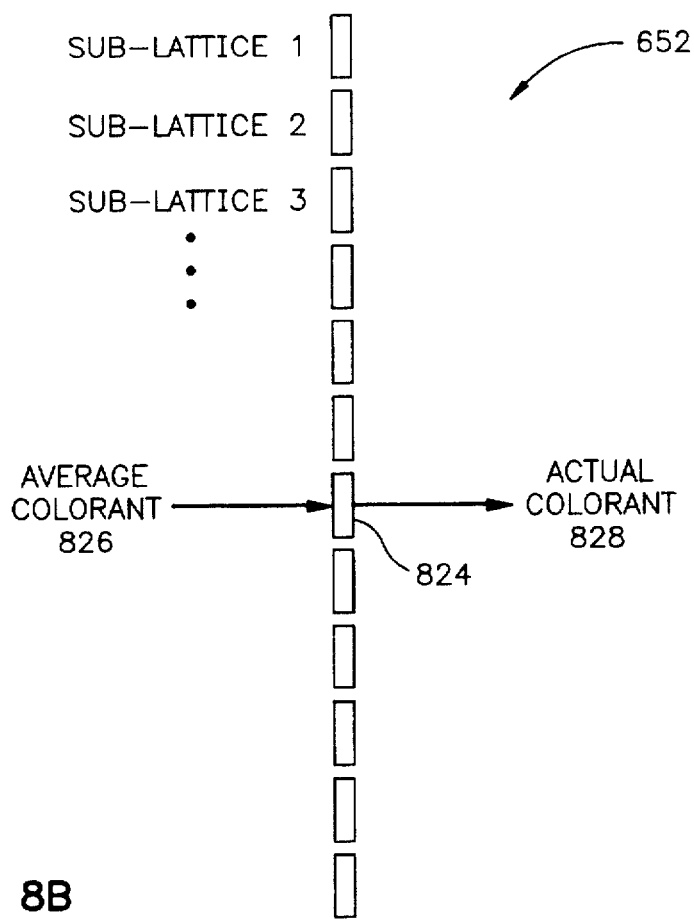
FIGS. 9-10 are diagrams illustrating the construction and use of an enhanced lookup table, in accordance with the invention.

With the average colorant in hand, task 808 proceeds to apply the relevant final lookup table to find the actual colorant. As shown in FIG. 8B, this is accomplished first by locating, among all final lookup tables 652, the final lookup table 824 of the relevant sub-lattice. The average colorant 826 is input into this table 824 to yield the actual colorant 828.

The above steps are repeated for each colorant, as shown by task 810. After all output colorants have been ascertained, task 812 employs the colorants in a manner specific to the output device for which the translation is being performed. For example, in the case of a computer printer, the colorants dictate the exact mix of printer dyes put down on the print media. The routine ends in task 814. The tasks 800 may also be illustrated using pseudo code, as shown below in Table 3.

ENHANCED LOOKUP TABLES

The present invention also contemplates a technique to reduce the time required to access the initial 650 and final 652 lookup tables during the translation process. This is accomplished by making certain modifications to the tables. In a general sense, the final lookup tables 652 are concatenated and the initial lookup table 650 modified, so that referencing the initial lookup table 650 automatically leads to the correct final lookup table 652.

Figure 9:
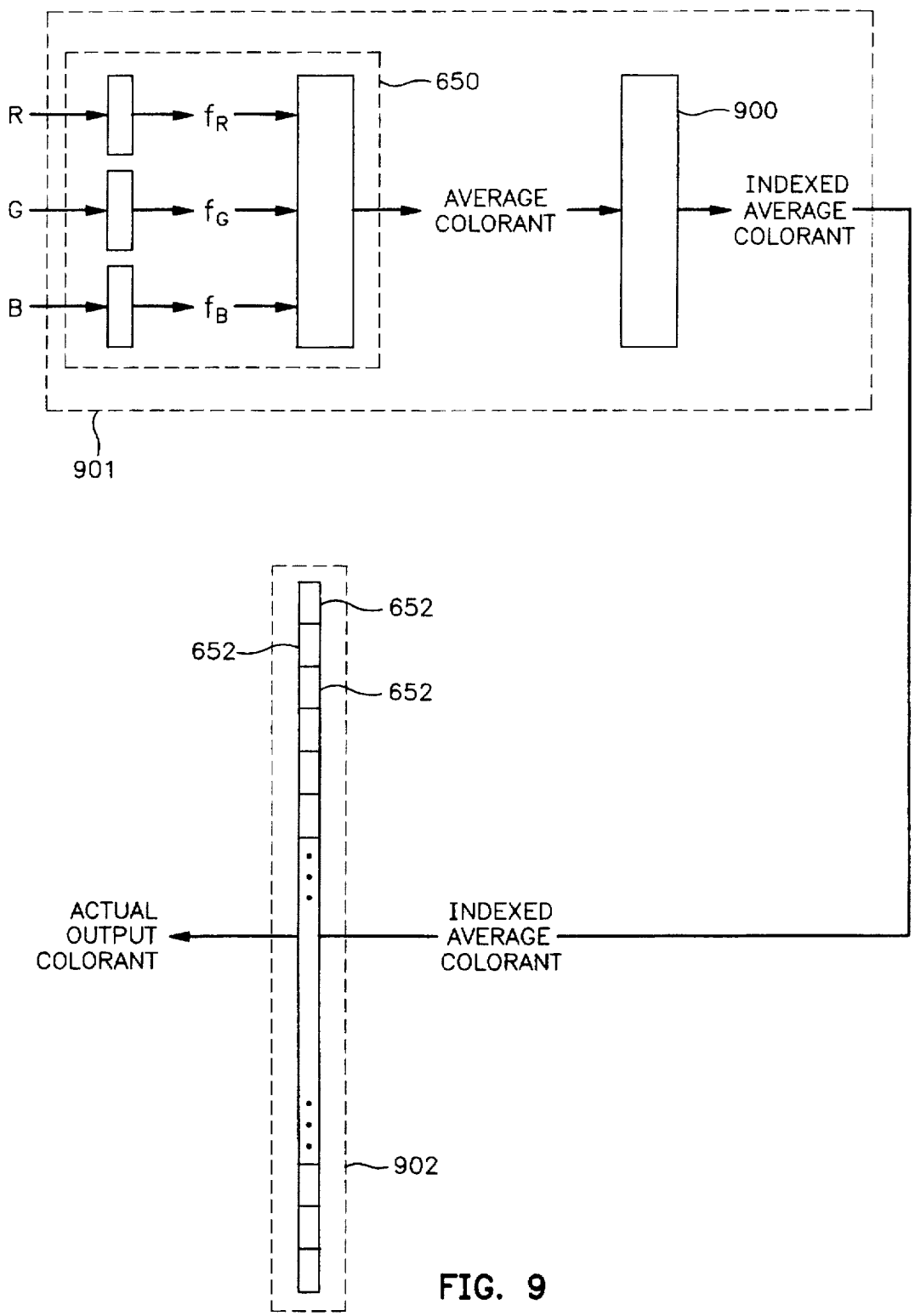

As shown in FIG. 9, this is accomplished by two primary modifications. First, the average colorants received from the initial lookup table 650 are selectively incremented by an index table 900 according to the ranges in which the input (R,G,B) values fall. To improve efficiency, the tables 650 and 900 may be integrated to provide a combined table 901. The second modification involves concatenating all of the final lookup tables 652 and selectively incrementing the input values of each table 652 so that each of the inputs of the tables 652 correspond to the unique indexed average colorant. This ensures that the input values of different table 652 do not overlap. Thus, by supplying an input color of (R,G,B), an actual output colorant is automatically provided.

The indexing of the average colorants is preferably conducted according to the range of possible input (R,G,B) values. This effectively creates a unique set of average colorant values for each sub-lattice. Where each primary color of (R,G,B) is an integer between 0 and 255, the index table 900 may increment the average colorant according by an amount shown in Equation 5, below:

INDEXED AVERAGE COLORANT=AVERAGE COLORANT+
[INT (R÷(256÷Z))*A]+[INT (G÷(256÷Z))*B]+[INT
(B÷(256÷Z))*C]                                                      [5]

For ease of understanding, Equation 5 will be discussed in the context of equally sized sub-lattices. In Equation 5, "INT(X)" denotes the operation of taking the integer value of the operand "X". The "Z" variable denotes the size of a sub-lattice's side. If 4096 sub-lattices are provided, for example, this yields sub-lattices of the dimension 16×16×16, and the sublattice tables are 32 bytes long, and "Z" would equal 16. A, B, and C are selected to ensure that no two possible values of (R,G,B) will produce overlapping indexed average colorants.

Where each sub-lattice is sized at 16×16×16 and the sub-lattice tables are 32 bytes long, A, B, and C may be established as follows:

A=32

B=16×32=512

C=16×16×32=8192

To be compatible with the indexed average colorants, the input values of the tables 652 are modified accordingly. Specifically, for each sub-lattices table 652, the greatest value of (R,G,B) present in that table may be input into Equation 5, and the average colorant input of that table modified accordingly.

Additionally, it will be apparent to those skilled in the art that the tables 901 and 902 may be repeated for the other colorants and combined to yield a single translation table 1000 (FIG. 10). The translation table 1000 provides actual values of all three colorants for any input colors, in a single step.

VARIATIONS

While there have been shown what are presently considered to be preferred embodiments of the invention, it will be apparent to those skilled in the art that various changes and modifications can be made herein without departing from the scope of the invention as defined by the appended claims.

For instance, the scope of the invention extends to other representations of color that are mathematical transformations of red, green, and blue. And, although the invention is not limited to ranges of color representation between 0–255, a 0–255 range may prove convenient for use in machines with 8-bit bytes. Along these lines, although it is not necessary, computation may be eased somewhat by using selecting lattices, sub-lattices, and maps whose sizes are powers of two. Furthermore, the invention is not limited to the use of red, green, and blue colors or cyan, magenta, and yellow colorants; other colors and colorants may be substituted. Additional component colors, such as black, may also be used in a color representation scheme contemplated by the invention, with a corresponding increase in the number of dimensions of the lattices.

TABLE 1

```
Procedure: SUBDIVIDE
    inputs L, M, N, S;
    // L is the input colorant lattice, a MxMxM sized matrix
    // N and S are parameters of the procedure:
    //    S is the sublattice size (SxSxS)
    //    N is the size of the nominal output table
```

TABLE 1-continued

```
    outputs R, G, B, T;
    // R, G, B are the 256-entry "input tables" produced by
         the procedure.
    // T is "output table" (second level table) produced by
         the procedure
    let NSL = SxSxS matrix of 0's; // "nominal sublattice"
    let K = (M-1) / (S-1); // number of sublattices in each dimension
    for i=1 to K;
        for j=1 to K;
            for k=1 to K;
                // this subroutine adds the sublattice i,j,k to NLS:
                call ADD_TO_NSL, (NSL, L, I, J, K);
            end;
        end;
    end;
    let min = minimum of all values in NSL;
    let max = maximum of all values in NSL;
    // replace each value X in NSL with (N-1) * (X - min) / (max - min):
    for i=1 to S;
        for j=1 to S;
            for k=1 to S;
                NSL[i;j;k] = (N-1) * (X - min) / (max - min);
            end;
        end;
    end;
    // "SOLVER" creates tables red, green, blue from NSL:
    call SOLVER(NSL, red, green, blue);
    let T = empty table of N * K * K * K entries;
    // fill out T by calling BESTFIT:
    let m = 0;
    for i=j to K
        for j=1 to K
            for k=1 to K
                call BESTFIT (NSL, L, i, j, k, T, m);
                increment m by N;
            end
        end
    end
    let R,G,B be empty tables of 256 entries:
    // Fill out R, G, and B:
    let OFFSETR, OFFSETG, OFFSETB = 0;
    for i=1 to 256 by 256/K;
        for j=1 to 256/K;
            R[i+j-1] = red[j] +   OFFSETR;
            G[i+j-1] = green[j] + OFFSETG;
            B[i+j-1] = blue[j] + OFFSETB;
        end;
        increment OFFSETR by N;
        increment OFFSETG by N * K;
        increment OFFSETB by N * K * K;
    end;
    return R, G, B, T;
    // Subroutines:
    Subroutine ADD_TO_NSL:
        inputs NSL, L, i, j, k, S;
        // NSL is an SxSxS matrix, the "nominal sublattice"
        // L is the input lattice
        outputs NSL;
        for i1 = 1 to S;
            for j1 = 1 to S;
                for k1 = 1 to S;
                    NSL[i1;j1;k1] = NSL[i1;j1;k1]
                        + L[(i-1)*(S-1)+i1;(j-1)*(S-1)+j2;(k-1)*(S-1)+k2];
                end;
            end;
        end;
    return NSL;
    Subroutine SOLVER: See Table 2 (below).
    Subroutine Interpolate (table v)
        inputs: v;         // vector of S entries
        outputs: table; // table (vector) of 256/K entries
        //expands v to fill table;
        let span = (256/K) / (S-1);
        for i=1 to 256/K by span;
```

TABLE 1-continued

```
    for j=0 to span-1;
        table[i+j] = (v[i] * (span-j) *v[i+1] * j / span;
    end;
end;
return table;
```

TABLE 2

```
Subroutine SOLVER:
    inputs NSL; // an SxSxS matrix
    outputs red, green, blue; // tables with 256/K entries
    initialize red, green blue = all 0's;
    for D=1 to 3; // 3 is the dimension of NSL
    // calculate the variance along axies:
        let c1, c2, c3 = vector of S 0's;
        for i=1 to S;
            for j=1 to S;
                for k=1 to S;
                    c1[i] = c1[i] + NSL[i;j;k] / (S*S);
                    c2[j] = c1[j] + NSL[i;j;k] / (S*S);
                    c3[k] = c1[k] + NSK[i,j,k] / (S*S);
                end;
            end;
        end;
    let var1, var2, var3 = 0;
    let avg1, avg2, avg3 = 0;
    for i=1 to s;
        var1 = var1 + c1[i]*c1[i] / S;
        avg1 = avg1 + c1[i] / S;
        var2 = var2 + c2[i]*c2[i] / S;
        avg2 = avg2 + c2[i] / S;
        var3 = var3 + c3[i]*c3[i] / S;
        avg3 = avg3 + c3[i] / S;
    end;
    var1 = var1 - avg1 * avg1;
    var2 = var2 - avg2 * avg2;
    var3 = var3 - avg3 * avg3;
    // pick largest variance
    if var1 > var2 and var1 > var3 then
        //build red table
        call Interpolate(red, c1);
        //remove red from NSL;
        for i=1 to S;
            for j=1 to S;
                for k=1 to s;
                    NSL[i;j;k] = NSL[i;j;k] - c1[i];
                end;
            end;
        end;
    else if var2 > var3 then
        // build green table
        call Interpolate (green, c1);
        //remove green from NSL:
        for i=1 to S;
            for j=1 to S;
                for k=1 to S;
                    NSL[i;j;k] = NSL[i;j;k]- c2[j];
                end;
            end;
        end;
    else
        if var3 = 0 then
            exit;
        // build blue table
        call Interpolate(blue, c1);
        // remove blue from NSL:
        for i=1 to S;
            for j=1 to S;
                for k=1 to S;
                    NSL[i;j;k] = NSL[i;j;k] - c3[k];
                end;
            end;
```

TABLE 2-continued

```
        end;
    endif;
end;
return red, green, blue;
```

TABLE 3

```
Function LOOKUP(r, g, b, NSLred, NSLgreen, NSLblue, output_tables)
    returns colorant; // value 0:255 of output colorant
    inputs r, g, b; // values 0:255 of input color
    inputs NSLred, NSLgreen, NSLblue; // nominal sublattice tables
                                       // for red, green, and blue
    inputs output_tables; // final output tables, one per sublattice
        // if there are IxJxK sublattices, and each output table
        // has N entries, output_tables can be viewed as a IxJxKxN
        // matrix
    i = INT (r/I); // the sublattice slice 'r' is in (minus 1)
    j = INT (g/J); // the sublattice slice 'g' is in (minus 1)
    k = INT (b/K); // the sublattice slice 'b' is in (minus 1)
    // calculate average colorant:
    let average_colorant =   NSLred[r - (i * 256/I)]
                           + NSLgreen[g - (j * 256/J]
                           + NSLblue[b - (k * 256/K];
    // calculate final colorant:
    let colorant = output_tables[i+1; j+1; k+1; average_colorant];
    return colorant;
```

What is claimed is:

1. A method of translating a color of a pixel described by a set of input values compatible with a first machine to a set of output values compatible with a second machine, comprising the steps of:

receiving a pixel from the first machine, said pixel including multiple input values, each input value corresponding to a level of a primary color present in the pixel;

determining an average output value corresponding to one of the output values by applying an initial lookup table constructed by receiving a multi-dimensional lattice containing an output value for each combination of input values, each output value being positioned by using its input values as multi-dimensional coordinates, dividing the lattice into multiple sub-lattices, averaging corresponding output values of the sub-lattices to produce a nominal sub-lattice, and constructing a lookup table to receive a set of input values and provide a corresponding average output value from the nominal sub-lattice;

identifying one of said sub-lattices that corresponds to the input values and applying a final lookup table to the average output value to determine an actual output value, wherein said final lookup table is specific to the identified sub-lattice and functions to apply a previously established best-fit relationship between average output values and actual output values corresponding to the identified sub-lattice;

repeating the determining and identifying steps for remaining ones of the set of output values; and storing the pixel in the second machine in accordance with the determined actual output values.

2. The method of claim 1, further comprising a step of displaying the pixel at the second machine in accordance with the actual output values.

3. A method of pre-programming a digital processing apparatus to translate pixels, used by a first machine and described by a multi-component set of input values, to a pixel described by a multi-component set of output values compatible with a second machine, comprising the steps of:

receiving a multi-dimensional lattice containing a set of output values for each combination of input values, each set of output values being positioned by using its input values as multi-dimensional coordinates;

dividing the lattice into multiple sub-lattices;

for each component of the set of output values, performing steps comprising:

averaging corresponding output values of the sub-lattices to produce a nominal sub-lattice;

constructing initial lookup tables to receive a set of input values and to provide a corresponding average output value from the nominal sub-lattice; and for each sub-lattice, constructing a final output table to provide an actual output value upon receipt of an average output value developing and applying a best-fit relationship between average output values and actual output values corresponding to that sub-lattice; and storing the initial and final lookup tables in memory accessible by the processor.

4. The method of claim 3, wherein two or more of the sub-lattices overlap each other.

5. The method of claim 3, wherein the output values comprise colorants specific to the second machine.

6. The method of claim 3, wherein the input values comprise colorants specific to the first machine.

7. The method of claim 3, wherein the input output values comprise machine-independent color representations.

8. The method of claim 7, wherein the color representations are expressed as a combination of red, blue, and green.

9. The method of claim 8, wherein each color representation is expressed as a combination of integer values of red, blue, and green, each integer value having a maximum of 255 and a minimum of 0.

10. The method of claim 3, wherein the output values comprise colorants specific to the second machine.

11. The method of claim 10, wherein the colorants are expressed as a combination of cyan, magenta, and yellow.

12. The method of claim 3, wherein the initial lookup tables are constructed using functional approximation techniques to describe average output values in terms of input values.

13. The method of claim 3, wherein the final lookup tables are constructed using least squares techniques to describe actual output values in terms of average output values.

14. The method of claim 3, further comprising steps for using the digital processing apparatus to translate a pixel used by the first machine and described by the multi-component set of input values to the multi-component set of output values compatible with the second machine, comprising the steps of:

receiving an input pixel described by the multi-component set of input values;

identifying the sub-lattice corresponding to the input values;

applying appropriate ones of the initial lookup tables to determine a set of average output values;

applying final lookup tables specific to the identified sub-lattice to determine a set of actual output values; and storing the set of actual output values in the second machine.

15. A graphics conversion apparatus, for translating a color of a pixel described by a multi-component set of input values compatible with a first machine to a multi-component set of output values compatible with a second machine, comprising:

a memory;

a processor programmed to build color compensation tables from a multi-dimensional lattice by performing steps comprising:

receiving a multi-dimensional lattice containing a set of output values for each combination of input values, each set of output values being positioned by using its input values as multi-dimensional coordinates;

dividing the lattice into multiple sub-lattices; and for each component of the set of output values, performing steps comprising:

averaging corresponding output values of the sub-lattices to produce a nominal sub-lattice;

constructing initial lookup tables to receive a set of input values and to provide a corresponding average output value from the nominal sub-lattice;

for each sub-lattice, constructing a final output table to provide an actual output value upon receipt of an average output value developing and applying a best-fit relationship between average output values and actual output values corresponding to that sub-lattice; and storing the initial and final lookup tables in the memory.

16. A program storage device readable by a digital processing apparatus and tangibly embodying a program of instructions executable by the digital processing apparatus to perform method steps for processing a pixel used by a first machine for use by a second machine, said method steps comprising:

receiving a pixel from the first machine, said pixel including multiple input values, each input value corresponding to a level of a primary color present in the pixel;

determining an average output value corresponding to one of the output values by applying an initial lookup table constructed by receiving a multi-dimensional lattice containing an output value for each combination of input values, each output value being positioned by using its input values as multi-dimensional coordinates, dividing the lattice into multiple sub-lattices, averaging corresponding output values of the sub-lattices to produce a nominal sub-lattice, and constructing a lookup table to receive a set of input values and provide a corresponding average output value from the nominal sub-lattice;

identifying one of said sub-lattices that corresponds to the input values and applying a final lookup table to the average output value to determine an actual output value, wherein said final lookup table is specific to the identified sub-lattice and functions to apply a previously established best-fit relationship between average output values and actual output values corresponding to the identified sub-lattice;

repeating the determining and identifying steps for remaining ones of the set of output values; and storing the pixel in the second machine in accordance with the determined actual output values.

* * * * *